United States Patent [19]

Hemond

[11] Patent Number: 4,484,289
[45] Date of Patent: Nov. 20, 1984

[54] TOTE DIRECTOR

[75] Inventor: Robert F. Hemond, Grand Rapids, Mich.

[73] Assignee: Rapistan Division of Lear Siegler, Inc., Grand Rapids, Mich.

[21] Appl. No.: 344,174

[22] Filed: Jan. 29, 1982

[51] Int. Cl.³ .............................................. G06F 15/20
[52] U.S. Cl. .................................. 364/478; 364/468; 198/341; 198/358
[58] Field of Search ............... 364/478, 479, 468, 469; 198/339, 340, 341, 350, 351, 356, 358; 414/136

[56] References Cited

U.S. PATENT DOCUMENTS

| | | | |
|---|---|---|---|
| 3,351,912 | 11/1967 | Collom et al. | 364/468 |
| 3,576,540 | 4/1971 | Fair et al. | 414/136 |
| 3,703,725 | 11/1972 | Gomersall et al. | 444/1 |
| 3,803,556 | 4/1974 | Duffy | 414/136 |
| 3,845,286 | 10/1974 | Aronstein et al. | 235/151.1 |
| 4,027,246 | 5/1977 | Caccoma et al. | 364/900 |
| 4,089,056 | 5/1978 | Barna et al. | 364/468 |
| 4,120,629 | 10/1978 | Christian et al. | 425/135 |
| 4,181,947 | 1/1980 | Krauss et al. | 364/478 |
| 4,228,513 | 10/1980 | Doljack | 364/550 |
| 4,237,598 | 12/1980 | Williamson | 364/478 |
| 4,240,148 | 12/1980 | Thoma | 364/478 |
| 4,295,198 | 10/1981 | Copeland et al. | 364/515 |
| 4,309,600 | 1/1982 | Perry et al. | 364/468 |
| 4,338,671 | 7/1982 | Korytkowski et al. | 364/478 |

Primary Examiner—Charles E. Atkinson
Assistant Examiner—John R. Lastova
Attorney, Agent, or Firm—Price, Heneveld, Huizenga & Cooper

[57] ABSTRACT

A system for controlling the flow of articles within a work area including a plurality of work stations and for acquiring real time information relating to the status of articles in process. The system comprises a sorting conveyor for delivering articles to be processed to the work stations from a storage area, means at each work station for indicating that an unprocessed article is requested at the station, and computer means coupled to the sorting conveyor and to the indicating means for controlling the movement of articles from the storage area to the work stations in response to work station requests and for providing information, based on articles dispatched to each work station, relating to the status of articles in process.

32 Claims, 5 Drawing Figures

TOTE DIRECTOR

BACKGROUND OF THE INVENTION

The present invention relates to conveying systems, and more particularly to sorting conveying systems.

Assembly areas typically include a plurality of work stations at which individual articles are assembled and a storage zone wherein articles to be assembled are stored. A variety of conveying systems have been developed to deliver articles from the storage zone to the individual work stations. More particularly, the conveying systems used are sorting conveyors, capable of delivering an individual article to a predetermined work station.

However, known sorting conveyor systems require some type of identification to be placed on the conveyed article so that the identification may be read by the system during article transportation to properly route the article. This requires the articles to be carefully and laboriously labeled, and further requires relatively complex and expensive devices for reading the identification and properly directing the articles through the system and diverting them at the destination work stations.

Additionally, it is desirable to collect management information from the individual work stations. More particularly, it is desirable to monitor the number and types of articles processed at the work stations to facilitate scheduling, to control inventory and work flow, and to evaluate the speed at which the operators are working. Additionally, it is also desirable to monitor the arrival, break, and departure times of the operators.

Typically, management data is collected by supervisors or by the operators themselves. In either event, a written record is maintained for each employee, setting forth the information outlined above, supplemented by punch time cards. This information is then analyzed by management personnel to schedule, to order inventory, and to determine whether the operators are performing satisfactorily. Optionally, the data may be first placed into some type of computerized data bank to ease the expedite this analysis. However, the written records are subject to human error as well as intentional misreporting, particularly if kept by the operators. The efficiency information is subject to transcription error if transferred to a data bank. Finally, the data collection requires excessive worker or supervisor time and gives the individual workers a feeling that they are being closely supervised.

SUMMARY OF THE INVENTION

The aforementioned problems are solved by the present invention. Essentially, a system for a work area is provided both for controlling the flow of materials within the work area and for automatically collecting management data relative to the flow of materials to obtain real time information regarding materials processed. More particularly, the system includes means at each work station for indicating that an article to be processed is requested at that station, a sorting conveyor for delivering the articles from a storage zone to the work stations, means for directing a particular article to a particular work station, means for storing data relating to each article transported including a number unique to the work station to which each article is to be transported, computer circuit means coupled to the work station indicating means and to the conveyor directing means and to the data storing means for controlling the conveyor directing means responsive to the first numbers to direct individual articles to the appropriate work stations in response to work station requests, and means for displaying the data. Additionally, the computer circuit means maintains a record for each work station of articles transported to that work station.

With the system of the present invention, article flow is controlled and worker efficiency may be monitored by the computer circuit means. By simply storing a number corresponding to the work station to which each article is to be sent, the computer generates appropriate control signals to cause the conveyor directing means to direct the article to the work station. Additionally, as the articles are sent, the computer maintains a log of the articles sent to the individual work stations so that one reviewing the log may easily and readily schedule, plan inventory, or evaluate the efficiency of workers at the work station.

The system of the present invention has several advantages over known systems. First, operator efficiency data for each work station is automatically compiled by the computer as articles are dispatched. Accordingly, the need for supervisory personnel and/or the need for individual operators to maintain time records is eliminated. Second, the need for identification on the articles transported, and the associated equipment for reading and diverting the article, is eliminated. Third, the workers do not feel as if someone is continually monitoring their progress, giving the workers at least the illusion of minimal supervision. Fourth, the automatic recording of efficiency information by the computer reduces the possibility for error both in record keeping and record transcription.

In a preferred embodiment of the invention, a common bus line interconnects the computer with both the work station indicating means and the conveyor directing means. The computer can communicate with any one of the work stations or any one of the components of the conveyor directing means by sending a signal addressed to that element over the bus line. In a further preferred embodiment, the work station indicating means are releasably connected to the bus line so that stations may be added to or deleted from the system as necessary. This greatly reduces the complexity and expense of hard wiring the computer to the associated elements, and also vastly increases the modularity of the system so that the system may expand or contract as work needs dictate.

These and other objects, advantages, and features of the invention will be more fully understood and appreciated with reference to the written specification and appended drawings.

DESCRIPTION OF THE PREFERRED EMBODIMENT

Figure 1:
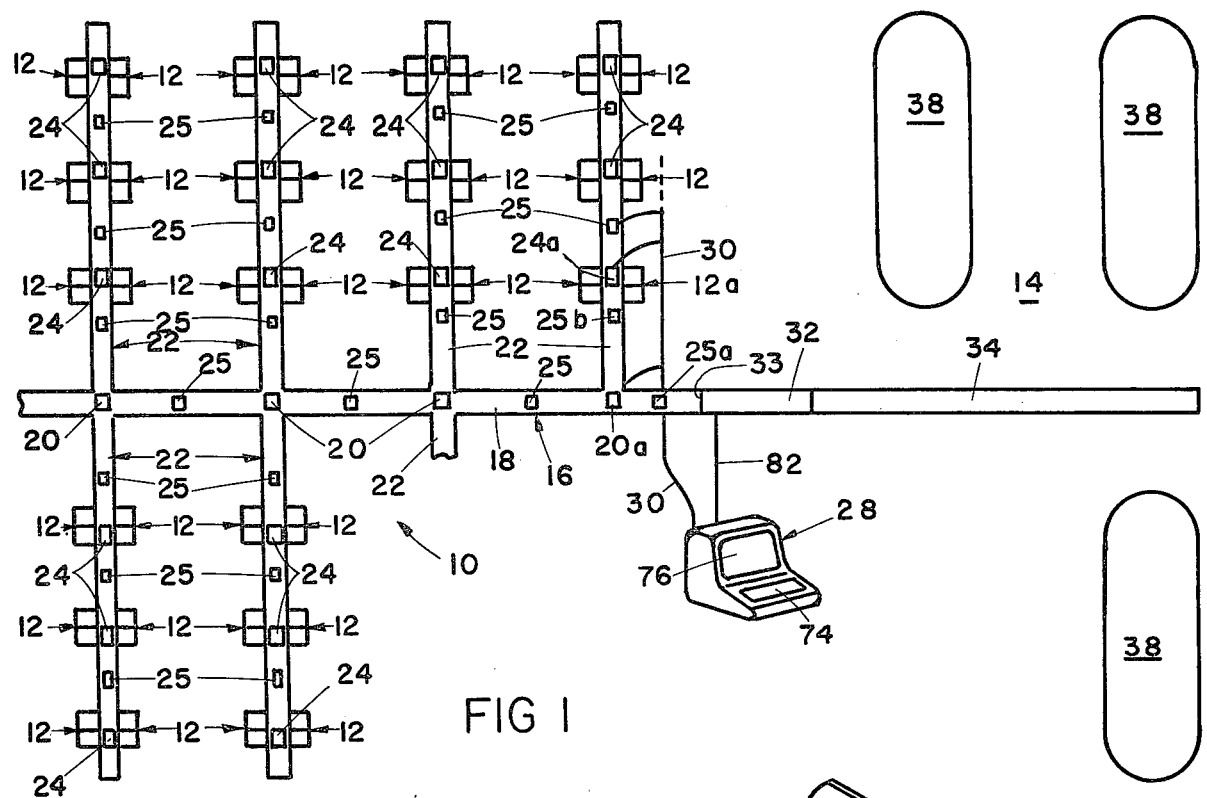
FIG. 1 is a plan view of the conveyor system of the present invention.
Figure 2:
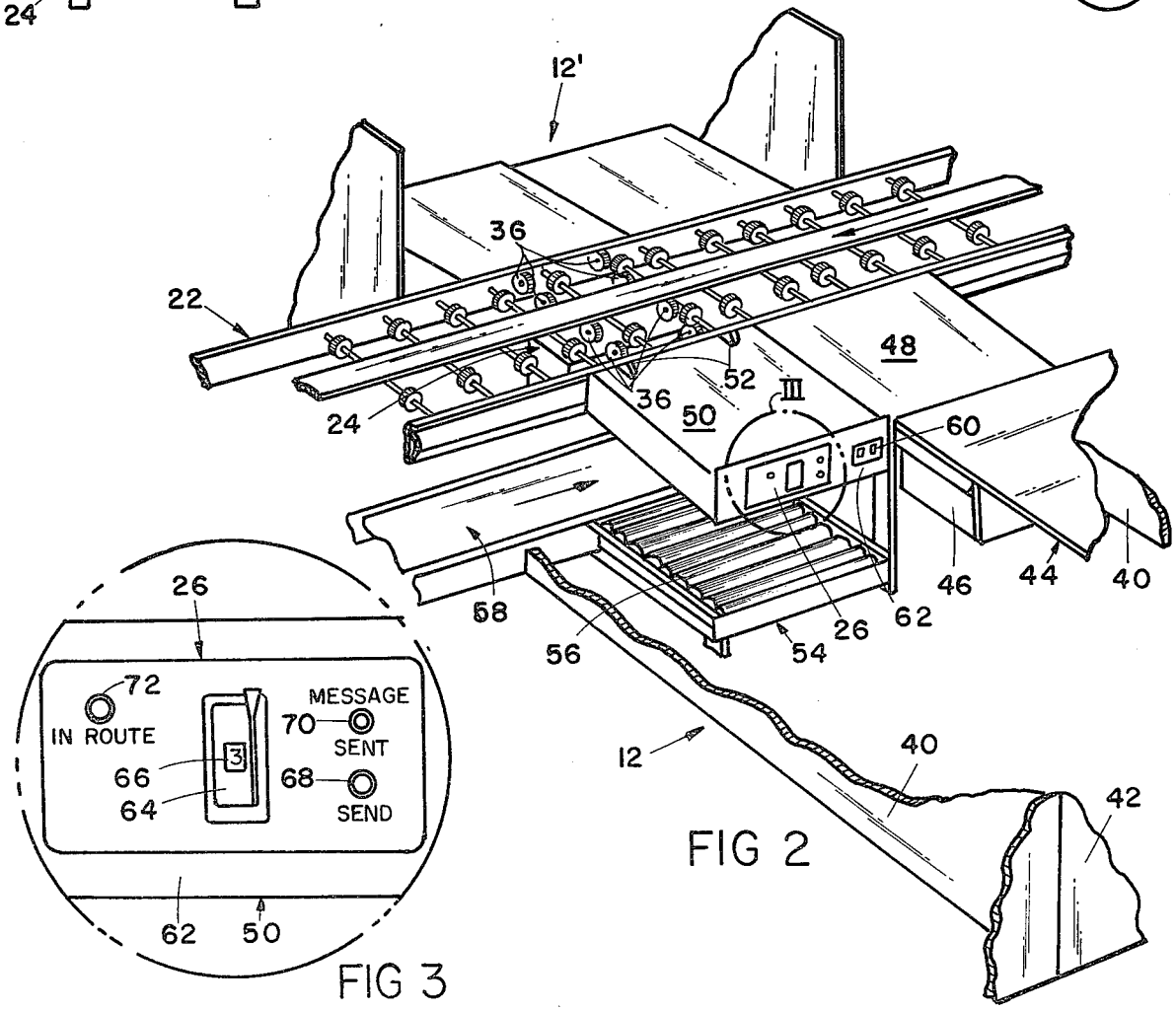
FIG. 2 is a fragmentary, perspective view of a work station.
Figure 3:
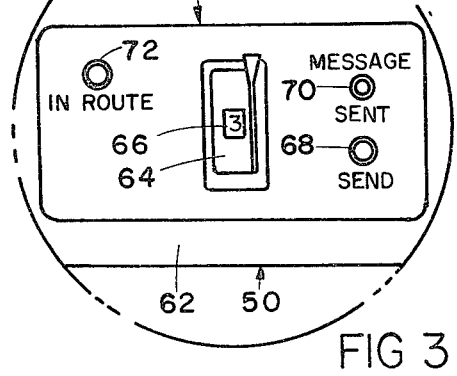
FIG. 3 is a fragmentary, elevational view of the area within line III in FIG. 2.

A conveyor and monitor system 10 (FIG. 1) in accordance with a preferred embodiment of the invention generally includes a plurality of work stations 12, storage zone 14, and conveyor 16 for transporting articles from the storage zone to the individual work stations. Conveyor 16 in turn includes primary sort line 18 and secondary sort lines 22 leading laterally therefrom. Primary diverters 20 are positioned along primary line 18 to divert articles off the primary line and onto secondary lines 22. Similarly, secondary diverters 24 are positioned along the secondary lines 22 to divert articles off the secondary lines and onto individual work stations 12. Position indicators 25 are positioned along primary line 18 and secondary lines 22 to track the position of articles on conveyor 16. Each of work stations 12 includes a remote station unit 26 (FIGS. 2 and 3). Computer 28 is coupled through bus line 30 to all of primary diverters 20, secondary diverters 24, position indicators 25, and remote station units 26 (FIG. 1). Computer 28 contains information relating to each article transported on conveyor 16, including a number unique to the particular work station 12 to which the article is to be transported.

When an operator at one of stations 12 requires an article to be assembled, or otherwise processed, he communicates with computer 28 using remote unit 26. An operator seated at computer 28 responds to the request and retrieves an appropriate article from storage zone 14 and places the article on conveyor 16. The computer operator then keys, or inputs, the unique number associated with the work station to which the article is to be delivered so that computer 28 generates control signals, in response to the number and to information from position indicators 25, to control diverters 20 and 24 to deliver the article to the desired station 12. Additionally, the computer maintains a log of the articles sent to each work station so that this information can be later displayed to evaluate the efficiency of the workers at the various stations.

Conveyor 16 (FIG. 1) is well known to those having ordinary skill in the art and, consequently, a detailed explanation of its construction and operation is unnecessary. Suffice it to say that conveyor 16 is a roller conveyor having a drive belt and includes primary sort line 18 which in turn includes induction area 32 and queue area 34. Gate 33 controls the release of articles from induction area 32. Secondary sort lines 22 extend laterally from primary line 18 and lead to individual work stations 12. Primary diverters 20 are positioned at the intersection of each secondary sort line 22 with primary line 18 so that the diverter may selectively transfer articles traveling on the primary line to the appropriate secondary line. Secondary diverters 24 are positioned along secondary lines 22 generally proximate each of work stations 12 and are identical to primary diverters 20. One of secondary diverters 24 is seen in FIG. 2, including diverter wheels 36 oriented generally perpendicularly to the wheels of the secondary line 22. Position indicators 25 are also well known in the art, for example either photosensitive or mechanical switches. One of indicators 25 is positioned between each pair of adjacent diverters 20 and 24.

Storage zone 14 (FIG. 1) includes carousels 38 in which articles, or work materials, to be assembled, or otherwise processed, are stored. In the preferred embodiment, these articles comprise electronic component kits which are to be assembled at the work stations. Each kit is placed in a plastic tote, or pan, which is approximately six inches deep, twenty inches wide, and twenty-four inches long. The totes containing the unassembled kits are placed in carousels 38 and later removed and placed on queue area 34 in response to requests from work station operators.

Each work station 12 (FIG. 2) is defined by secondary line 22, opposed side walls 40 extending laterally therefrom, and end wall 42 extending between the side walls opposite secondary line 22. A bench 44, including a drawer 46 for tools and supplies, is located adjacent one of side walls 40. Extending between, and generally level with secondary line 22 and desk 44 is work area 48. Immediately adjacent, and generally level with, both secondary line 22 and work area 48 is staging area 50, which is also adjacent diverter 24 so that articles diverted from secondary line 22 into work station 12 are deposited on the staging area. Staging area 50 further includes two rollers 52 adjacent secondary line 22 to facilitate the transfer of articles onto the staging area. Return 54 is located directly below staging area 50 and includes a plurality of closely spaced rollers 56 leading to return conveyor 58 located directly below secondary line 22. Conveyor 58 leads to a storage zone for assembled kits, and in the preferred embodiment is a slider belt conveyor. Staging area 50 further includes face 62 in which is mounted conventional electrical outlet 60. An adjacent work station 12' is located opposite station 12 across secondary line 22.

Remote station unit 26 (FIGS. 2 and 3) is also mounted in forward face 62 of staging area 50. Unit 26 includes message switch 64 (FIG. 3), which is a conventional multi-position thumb wheel switch. In the preferred embodiment, the switch is capable of ten positions indicated by a numerals 0 through 9 in window 66. In the preferred embodiment, only four of the switch positions are used as follows:
1. Tote requested: the work station operator is ready to receive a tote;
2. Tote received: a tote sent to the work station has been received;
3. Leaving station: the work station operator is leaving the station for a short period of time, for example a break; and
4. Station off: the work station operator is leaving the station for an extended period of time, for example at the end of the work day.

By depressing switch 68, the signal selected on switch 64 is transmitted over bus line 30 to computer 28 (see also FIG. 1). "Message sent" light 70 is lit to indicate that a message has been sent from unit 26 to computer 28. This light remains lit for a brief period of time after the message has been sent to inform the work station operator that the message has been received by computer 28. If the message sent is illegal or not allowed in the proper sequence, light 70 will blink informing the work station operator to select a different message code on thumb wheel 64 and retransmit by depressing send button 68. "In route" light 72 is lit to indicate that a tote is in route from storage area 14 to work station 12. This light will remain lit until the work station operator transmits a "tote received" signal back to computer 28.

Figure 4:
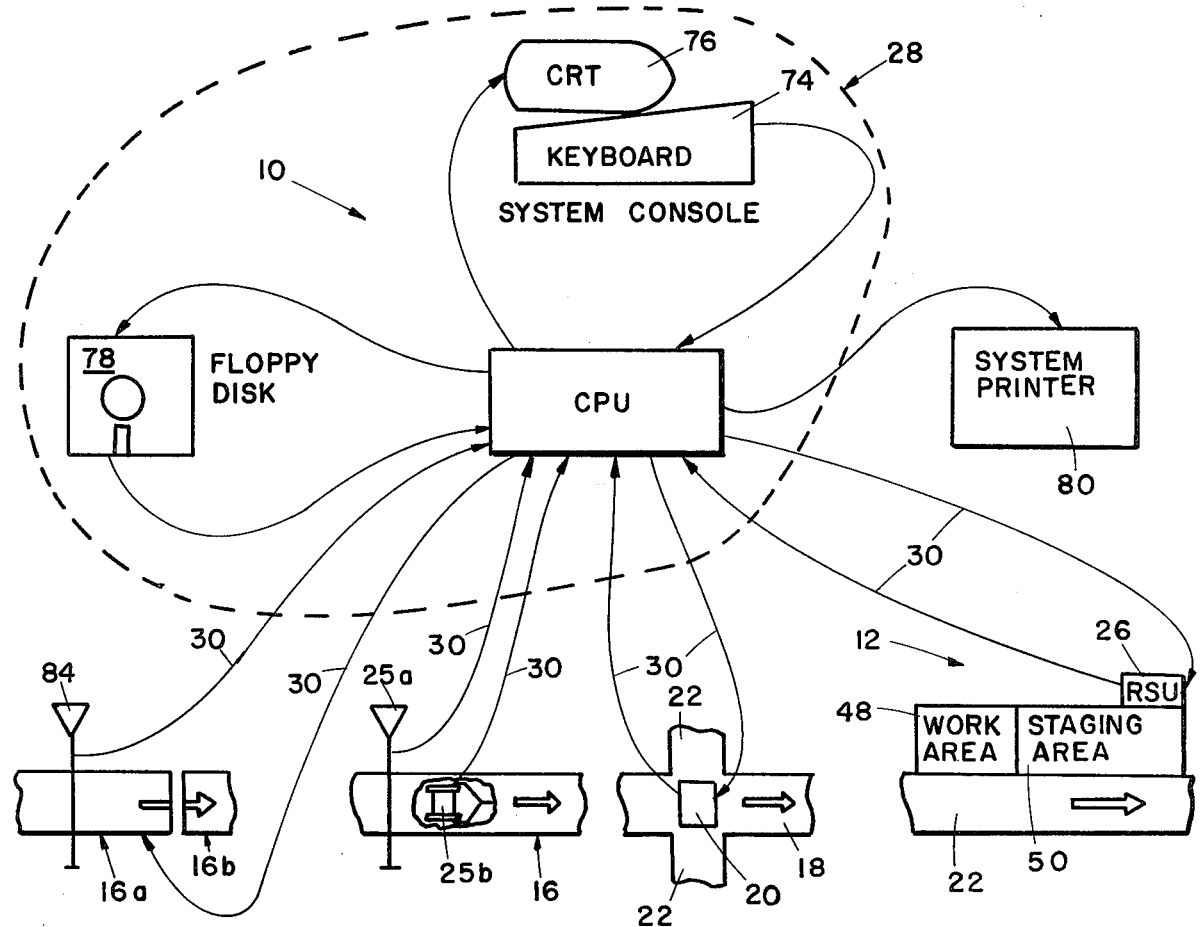
FIG. 4 is a fragmentary, schematic view of the computer and the bus line connections within the system.

Computer 28 (FIGS. 1 and 4) is also well known, being a mini or micro-computer including central processing unit (CPU) 73, keyboard 74, and CRT display screen 76. For secondary storage, computer 28 also includes floppy disk 78 (FIG. 4). Finally, printer 80 is also coupled to computer 28 to print permanent records of activities monitored by the computer, including worker efficiency reports.

Computer 28 (FIGS. 1 and 4) is connected, or coupled, through bus line 30 to all of position indicators 25, primary diverters 20, secondary diverts 24, and remote station units 26. Signals are received by computer 28 from both the pulse position indicators and the remote station units, while on the other hand control signals are generated by the computer and sent to diverters 20 and 24 and the remote station units. Additionally, computer 28 is connected through line 82 to induction gate 33. Bus line 30, in the preferred embodiment, is a four-wire bus providing serial two-way communications between computer 28 and the coupled devices. Two lines are used to send signals from the computer, while the other two lines are used to transmit messages to the computer. Each of diverters 20 and 24, position indicators 25, and remote station units 26 is identified by a unique address. When computer 28 sends a signal to a particular device, it sends a communication word which includes an address portion and a message portion. Although all devices connected to computer 28 receive the message, only the device assigned the particular address will respond to the message received. Similarly, when computer 28 desires information from any one of the devices connected to bus line 30, the computer polls that device using the address assigned to that device. If that device desires to transmit a message, the message is forwarded to computer 28, whereupon the computer appropriately processes the message.

It should be noted that although several lines are designated 30 in FIG. 4, the lines are shown separately in FIG. 4 only for clarity. All of position indicators 25, diverters 20 and 24, and remote station units 26 are connected to common bus line 30. Position indicators 25, namely optical switches 25a and mechanical switches 25b (FIG. 4) are connected to computer 28 through bus line 30. Accordingly, when an article is transported on conveyor 16 and trips one of switches 25, that switch transmits an appropriate signal to computer 28 over bus line 30 in response to being polled.

Primary diverter 20 is also connected through bus line 30 to computer 28 (FIG. 4). When an article transported on primary line 18 approaches a diverter 20, and when computer 28 determines that that particular diverter 20 must divert the article onto one of the adjacent secondary lines 22, a control signal is generated by computer 28 and transmitted to that diverter 20 over bus line 30, arming the diverter. Accordingly, when the article is directly over diverter 20 as determined by switches (not shown), the diverter reacts to transfer the article onto the appropriate secondary line. Diverters 24 positioned along each secondary line 22 are actuated in a similar manner to divert, or direct, each article to its selected destination work station.

Remote station unit 26 (FIG. 4) is also connected through bus line to computer 28. Messages are transmitted to the computer by selecting an appropriate message number 66 on thumb wheel 64 and depressing send button 68 (see also FIG. 3). Computer 28 may illuminate either one of lights 70 and 72 by delivering the appropriate control signals thereto.

Also connected through bus line 30 to computer 28 are a plurality of position switches 84 (FIG. 4). These switches indicate to computer 28 when an article is leaving a first section of conveyor 16a and entering a second section of conveyor 16b. In response to such an indication, computer 28 generates appropriate control signals to deactivate the drive belt in section 16a and to activate movement of the drive belt 18b. In this manner, operation of the conveyor is limited only to those sections which are actually in demand.

All of indicators 25, diverters 20 and 24, and units 26 are releasably coupled to bus line 30 so that these devices may be readily added to, or deleted from, system 10 to correspond to needs of the system.

OPERATION

After system 10 is assembled as described above, it is necessary to initialize the system. Position indicators 25, diverters 20 and 24, and remote station units 26 are assigned a unique address so that each of these devices is individually identifiable by the computer and may be individually addressed. This identification data is then stored in computer 28, and more particularly floppy disk 78, together with identification or the route from induction area 32 to each of the work stations 12. For example, to deliver an article to work station 12a (FIG. 1), computer 28 must be programmed to issue 1) a "right divert" control signal to diverter 20a after receiving an article-present signal from position indicator 25a and 2) a "right divert" control signal to diverter 24a after receiving an article-present signal from indicator 25b to deposit the article on the staging area of work station 12a. A target assembly time for each type of kit is also stored on disk 78. Further, computer 28 must be programmed to display messages from the individual remote station units 26 on CRT 76. Additional programming is required to maintain a log of articles sent to each work station 12. All initialization and programming may be readily implemented by those having ordinary skill in the art.

As workers arrive at their individual work stations 12, they so indicate to computer 28 through remote station unit 26. Message switch 64 is rotated until message number 1 appears in window 66 and switch 70 is depressed, indicating that a tote is requested at that particular work station. When computer 28 polls that work station 12 over line 30, the remote station unit 26 transmits a "tote request" message to the computer, which displays the message on CRT 76. Upon viewing the tote request, the operator at computer 28 retrieves an appropriate article to be processed from one of carousels 38 in storage zone 14. If a variety of types of articles are stored in storage zone 14, the operator should select a type appropriate for the particular work station. Preferably, the computer contains information specifying the types of articles which may be sent to each work station according to a worker's efficiency and/or skill or the facilities available at the station. This information is displayed on CRT 76 with the tote request. After the article is retrieved from zone 14, it is placed on queue 34, whereupon it indexes forward toward induction area 32 until the article abuts gate 33. The computer operator must enter data into computer 28 on keyboard 74 relating to the article—a first number is unique to the kit; a second number is unique to the type of kit; a third number is unique to the address of the work station to which the article is to be delivered. The operator then releases the article permitting gate 33 to open so that the tote is allowed to leave induction area 32 and travel along conveyor 16.

After leaving the induction area, the position of the tote is monitored by position indicators 25, which are continually polled by computer 28 over bus line 30. In response to the signals from position indicators 25 and in response to the routing information stored on floppy disk 78, computer 28 generates appropriate control signals and sends same to the appropriate diverters 20 and 24 over bus line 30 to direct the article to the addressed work station 12. Additionally, when the address of a work station is entered on keyboard 74 and an article released, computer 28 sends a message to remote station unit 26, illuminating light 72, indicating that a tote is in route to the work station. When the tote arrives, the operator at the work station rotates thumb wheel 64 until message number 2 appears in window 66 and depresses send button 68 to indicate that the tote has been received. Computer 28 then returns a control signal extinguishing light 72.

A similar procedure is repeated for each work station 12 in system 10. As totes are requested by the individual station operators, the induction operator retrieves the articles from zone 14 and inducts them onto conveyor 16 as described.

When a work station operator completes assembly of a kit, he returns the kit to the tote and places same on return 54, pushing the tote onto return belt 58. The operator then requests a new tote. Return belt 58 returns the tote to storage zone 14, where the tote is replaced on one of carousels 38.

If a work station operator desires to leave his work station 12 for a brief period after completing assembly of a kit, he selects message number 3 on thumb wheel switch 64 and presses send button 68. Upon returning to his work station, the operator again requests a tote. Additionally, the operator may indicate that he will be leaving his station for an extended period of time, such as at the end of the day, by transmitting a message number 4 on his remote station unit 26.

Computer 28 collects real time information in response to messages received from units 26 and keyboard 74 relating to the status of materials in process. When a tote is inducted onto conveyor 16, the operator at computer 28 enters three numbers, the first of which is unique to the kit, the second unique to the type of kit, and the third unique to the work station to which the article is to be delivered (i.e., the work station address). This information is then recorded on floppy disk 78 with the target time for assembly of the kit type, which may be retrieved from information stored on the disk. Additionally, computer 28 automatically records the time at which each article is inducted, as well as the time at which each operator arrives at his work station, leaves for, and returns from breaks, and leaves at the end of the work day, all in response to messages sent from the work station operators over their individual remote station units. From this timing data, the computer computes the residence time of each article at the work station at which same was processed and records this information also. This data may be printed out at any time on printer 80 and can provide such information as the following:

1. work station assignments by work station;
2. work stations which exceed the target time to complete kit assembly;
3. work station assignments by kit number;
4. work stations on line;
5. hours worked by work stations;
6. work stations which exceed the break time;
7. the number of totes dispatched during a specified shift;
8. work stations requiring help; and
9. work stations about to complete assembly of current kit.

This information can then be analyzed to plan scheduling, to acquire inventory, and to determine where management intervention is necessary, for example to determined where help and supervision are necessary and to reward aboveaverage performances.

Figure 5:
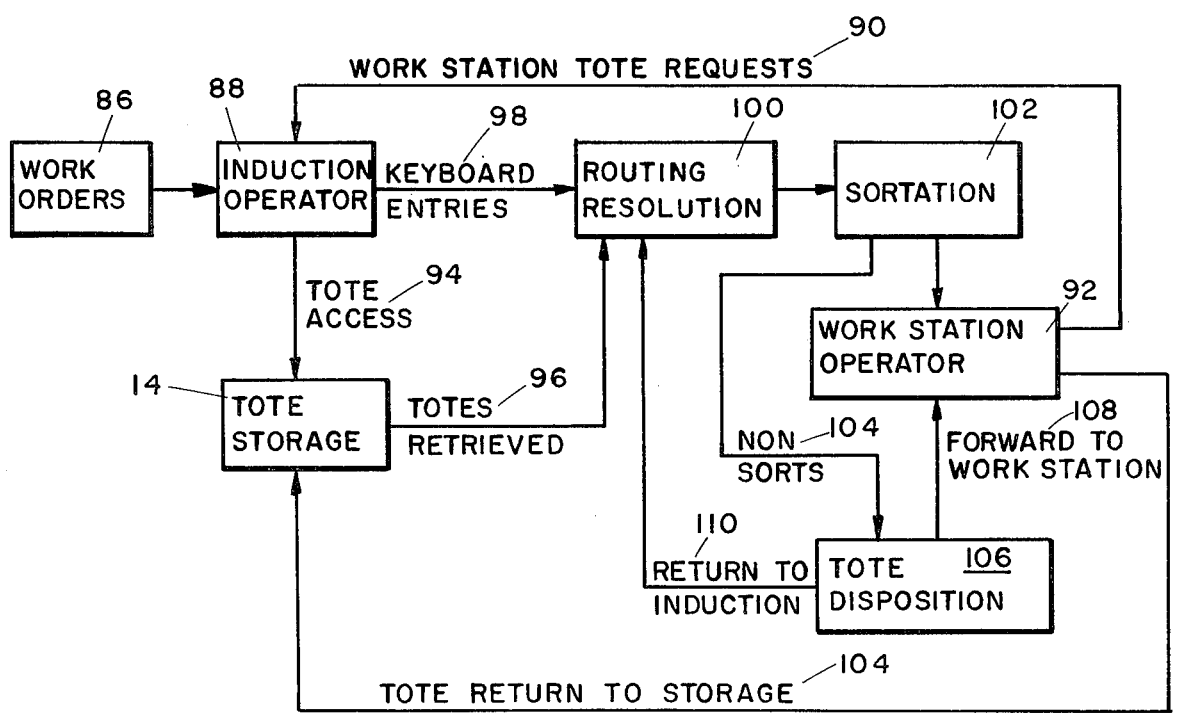
FIG. 5 is a flow chart of information and activity paths within the system.

FIG. 5 summarizes the processing of information and the activities of the operators within system 10. Induction operator 88 if informed of work orders 86, so that the operator can make decisions regarding which kits must be assembled to fill the work orders. Induction operator 88 is also informed of tote requests 90 from work station operators 92, and in response accesses totes as indicated at 94 from storage zone 14. The requested totes are retrieved from storage as indicated at 96 and after passing into induction area 32 (see also FIG. 1), induction operator 88 makes keyboard entries, as indicated at 98, relating to the article and the destination work station. Computer 28 makes routing resolutions 100 based on information stored on floppy disk 78 and the keyboard entries. The totes are then sorted as indicated at 102 as they travel along conveyor 16 to be directed to the appropriate station operators 92. After work station operator 92 has completed assembly of the kit, he places the kit in the tote and returns same to storage as indicated at 104 via return conveyor 58 (see also FIG. 2) and issues a new tote request 90 to induction operator 88. If a tote is not properly directed to a work station as at 104, a tote disposition decision 106 is made, and the tote is either manually transported to the work station as at 108 or reinducted as at 110.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A method of acquiring real time information regarding the status of work materials in process within a work area, said work area including a plurality of work stations at which the work materials are processed by human operators, said method comprising the steps of:
   transporting a work material directly from a central storage zone to a work station in response to a request received at the storage zone from the operator at the work station;
   storing data in real time for each work material transported including a station number unique to the work station to which the work material is transported, said data further including a target time number unique to a target residence time for said material; and
   displaying said real time data for facilitating future work material flow through said work area.

2. A method as defined in claim 1 further comprising determining the residence time of each of the work materials at said work stations, and wherein said data further comprises a residence time number unique to said residence time.

3. A method as defined in claim 2 or 1 wherein said data further comprises a type number unique to the type of each work material.

4. A method as defined in claim 3 wherein said data further comprises a transport time number unique to the time at which each work material is transported.

5. A method as defined in claim 4 wherein said data comprises a material number unique to each work material so that one can determine at which work station each work material was processed by comparing said material number and said station number.

6. A method as defined in claim 2 or 1 wherein said data further comprises a transport time number unique to the time at which each work material is transported.

7. A method of acquiring real time information regarding the status of work materials in process within a work area, said work area including a plurality of work stations at which the work materials are processed by human operators, said method comprising the steps of:
transporting a work material directly from a central storage zone to a work station in response to a request received at the storage zone from the operator at the work station;
storing data in real time for each work material transported including a station number unique to the work station to which the work material is transported;
indicating at the work stations when work materials are in route to the work stations; and
displaying said real time data for facilitating future work material flow through said work area.

8. A system for controlling, and collecting real time data relative to, the flow of work materials within a work area including a plurality of work stations at which said materials are processed by human operators, said system comprising:
a central dispatch station;
station signaling means at each of the work stations for indicating to said central dispatch station that an unprocessed work material is requested at the work station;
conveyor means for transporting unprocessed work materials from said central dispatch station directly to the work stations, said conveyor means including means for directing each work material to a particular work station;
memory means for storing data in real time relating to each work material transported by said conveyor means, said data including a station number unique to the work station to which said material is to be transported, said data further including a target time number unique to the target residence time required to process the work material at the work station, said memory means including data entry means at said central dispatch station actuated upon the introduction of each work material into said conveyor means at said central dispatch station;
computer circuit means coupled to said conveyor means and to said memory means for controlling said directing means in response to said station numbers to deliver each of said transported materials to the desired work station; and
display means coupled to said memory means for real time displaying of said data to provide real time information relating to materials in process.

9. A system as defined in claim 8 wherein each of the work materials is of a certain type, and wherein said data further includes a material type number unique to the material type.

10. A system as defined in claim 8 or 9 wherein said data further includes a material number unique to each work material, whereby one viewing said display means can determine at which work station each of said materials was processed based on said station number and said material number.

11. A system as defined in claim 8 or 9 wherein said data further comprises a time sent number unique to the time at which the work material is transported.

12. A system as defined in claim 8 wherein said data further includes a residence time number unique to the actual residence time of the work material at the work station.

13. A system for controlling, and collecting real time data relative to, the flow of work materials within a work area including a plurality of work stations at which said materials are processed by human operators, said system comprising:
a central dispatch station;
station signaling means at each of the work stations for indicating to said central dispatch station that an unprocessed work material is requested at the work station;
conveyor means for transporting unprocessed work materials from said central dispatch station directly to the work stations, said conveyor means including means for directing each work material to a particular work station;
memory means for storing data in real time relating to each work material transported by said conveyor means, said data including a station number unique to the work station to which said material is to be transported, said data further including a material number unique to each work material, said memory means including data entry means at said central dispatch station actuated upon the introduction of each work material into said conveyor means at said central dispatch station;
computer circuit means coupled to said conveyor means and to said memory means for controlling said directing means in response to said station numbers to deliver each of said transported materials to the desired work station; and
display means coupled to said memory means for real time displaying of said data to provide real time information relating to materials in process, whereby one viewing said display means can determine at which work station each of said materials was processed based on said station number and said material number.

14. A system as defined in claim 13 wherein each of the work materials is of a certain type, and wherein said data further includes a material type number unique to the material type.

15. A system for controlling, and collecting real time data relative to, the flow of work materials within a work area including a plurality of work stations at which said materials are processed by human operators, said system comprising:
a central dispatch station;
station signaling means at each of the work stations for indicating to said central dispatch station that an unprocessed work material is requested at the work station;
conveyor means for transporting unprocessed work materials from said central dispatch station directly to the work stations, said conveyor means including means for directing each work material to a particular work station;

memory means for storing data in real time relating to each work material transported by said conveyor means, said data including a station number unique to the work station to which said material is to be transported, said data further including a time sent number unique to the time at which the work material is transported, said memory means including data entry means at said central dispatch station actuated upon the introduction of each work material into said conveyor means at said central dispatch station;

computer circuit means coupled to said conveyor means and to said memory means for controlling said directing means in response to said station numbers to deliver each of said transported materials to the desired work station; and display means coupled to said memory means for real time displaying of said data to provide real time information relating to materials in process.

16. A system as defined in claim 15 wherein each of the work materials is of a certain type, and wherein said data further includes a material type number unique to the material type.

17. A system for controlling, and collecting real time data relative to, the flow of work materials within a work area including a plurality of work stations at which said materials are processed by human operators, said system comprising:

a central dispatch station;

station signaling means at each of the work stations for indicating to said central dispatch station that an unprocessed work material is requested at the work station;

conveyor means for transporting unprocessed work materials from said central dispatch station directly to the work stations, said conveyor means including means for directing each work material to a particular work station;

memory means for storing data in real time relating to each work material transported by said conveyor means, said data including a station number unique to the work station to which said material is to be transported, said memory means including data entry means at said central dispatch station actuated upon the introduction of each work material into said conveyor means at said central dispatch station;

computer circuit means coupled to said conveyor means and to said memory means for controlling said directing means in response to said station numbers to deliver each of said transported materials to the desired work station;

second signaling means at each of the work stations coupled to said computer circuit means for indicating to the operator at the work station that a work material is in route to the work station; and display means coupled to said memory means for real time displaying of said data to provide real time information relating to materials in process.

18. A system for controlling, and collecting real time data relative to, the flow of work materials within a work area including a plurality of work stations at which said materials are processed by human operators, said system comprising:

a central dispatch station;

station signaling means at each of the work stations for indicating to said central dispatch station that an unprocessed work material is requested at the work station;

conveyor means for transporting unprocessed work materials from said central dispatch station directly to the work stations, said conveyor means including means for directing each work material to a particular work station;

memory means for storing data in real time relating to each work material transported by said conveyor means, said data including a station number unique to the work station to which said material is to be transported, said memory means including data entry means at said central dispatch station actuated upon the introduction of each work material into said conveyor means at said central dispatch station;

computer circuit means coupled to said conveyor means and to said memory means for controlling said directing means in response to said station numbers to deliver each of said transported materials to the desired work station;

third signal means at each of the work stations coupled to said computer circuit means for indicating to the central dispatch station that the operator is not present at the work station; and display means coupled to said memory means for real time displaying of said data to provide real time information relating to materials in process.

19. A system for controlling, and collecting real time data relative to, the flow of work materials within a work area including a plurality of work stations at which said materials are processed by human operators, said system comprising:

a central dispatch station;

station signaling means at each of the work stations for indicating to said central dispatch station that an unprocessed work material is requested at the work station;

conveyor means for transporting unprocessed work materials from said central dispatch station directly to the work stations, said conveyor means including means for directing each work material to a particular work station, said conveyor means further including indicator means for indicating the position of materials on said conveyor;

memory means for storing data in real time relating to each work material transported by said conveyor means, said data including a station number unique to the work station to which said material is to be transported, said memory means including data entry means at said central dispatch station actuated upon the introduction of each work material into said conveyor means at said central dispatch station;

computer circuit means coupled to said conveyor means and to said memory means for controlling said directing means in response both to said station numbers and to said position indicating means to deliver each of said transported materials to the desired work station; and display means coupled to said memory means for real time displaying of said data to provide real time information relating to materials in process.

20. A system for controlling, and collecting real time data relative to, the flow of work materials within a work area including a plurality of work stations at which said materials are processed by human operators comprising:
- a central storage area in which work materials are stored, said storage area including a central dispatch station for dispatching work materials from said storage zone;
- signaling means at each of said work stations for indicating to said central dispatch station that work material is requested at the work station;
- sorting conveyor means for transporting the work materials from said central dispatch station directly to the work stations;
- computer memory means for storing data in real time for each work material dispatched from said central dispatch station, said data including a station number unique to the work station to which each material is to be transported by said sorting conveyor means, said memory means including data entry means at said central dispatch station;
- computer circuit means coupled to said memory means and to said sorting conveyor means for controlling said sorting conveyor means in response to said data to deliver each of said transported materials to the desired work station, the work stations being releasably coupled to said computer circuit means so that work station can be readily added to or deleted from said system; and
- display means coupled to said computer circuit means for displaying said data in real time to provide real time information relating to the materials.

21. A system as defined in claim 20 wherein each of said materials is of a certain type, and wherein said data further includes a type number unique to said material type.

22. A system for controlling, and collecting real time data relative to, the flow of work materials within a work area including a plurality of work stations at which said materials are processed by human operators comprising:
- a central storage area in which work materials are stored, said storage area including a central dispatch station for dispatching work materials from said storage
- signaling means at each of said work stations for indicating to said central dispatch station that work material is requested at the work station;
- sorting conveyor means for transporting the work materials from said central dispatch station directly to the work stations;
- computer memory means for storing data in real time for each work material dispatched from said central dispatch station, said data including a station number unique to the work station to which each material is to be transported by said sorting conveyor means, said data further including a target residence number unique to the target time required to process each work material at the work station, said memory means including data entry means at said central dispatch station;
- computer circuit means coupled to said memory means and to said sorting conveyor means for controlling said sorting conveyor means in response to said data to deliver each of said transported materials to the desired work station; and
- display means coupled to said computer circuit means for displaying said data in real time to provide real time information relating to the materials.

23. A system as defined in claim 22 or 21 wherein said data further includes a material number unique to said material, whereby one viewing said display means can determine at which work station each of said materials was processed by examining said material number and said station number.

24. A system as defined in claim 22 or 21 wherein said data further comprises a dispatch time number unique to the time at which said material is dispatched from said central dispatch station.

25. A system as defined in claim 22 wherein said data further includes a residence time number unique to the actual residence time of the work material at the work station.

26. A system for controlling, and collecting real time data relative to, the flow of work materials within a work area including a plurality of work stations at which said materials are processed by human operators comprising:
- a central storage area in which work materials are stored, said storage area including a central dispatch station for dispatching work materials from said storage zone;
- signaling means at each of said work stations for indicating to said central dispatch station that work material is requested at the work station;
- sorting conveyor means for transporting the work materials from said central dispatch station directly to the work stations;
- computer memory means for storing data in real time for each work material dispatched from said central dispatch station, said data including a station number unique to the work station to which each material is to be transported by said sorting conveyor means, said data further including a material number unique to said material, said memory means including data entry means at said central dispatch station;
- computer circuit means coupled to said memory means and to said sorting conveyor means for controlling said sorting conveyor means in response to said data to deliver each of said transported materials to the desired work station; and
- display means coupled to said computer circuit means for displaying said data in real time to provide real time information relating to the materials, whereby one viewing said display means can determine at which work station each of said materials was processed by examining said material number and said station number.

27. A system as defined in claim 26 wherein each of said materials is of a certain type, and wherein said data further includes a type number unique to said material type.

28. A system for controlling, and collecting real time data relative to, the flow of work materials within a work area including a plurality of work stations at which said materials are processed by human operators comprising:
- a central storage area in which work materials are stored, said storage area including a central dispatch station for dispatching work materials from said storage zone;
- signaling means at each of said work stations for indicating to said central dispatch station that work material is requested at the work station;

sorting conveyor means for transporting the work materials from said central dispatch station directly to the work stations;
computer memory means for storing data in real time for each work material dispatched from said central dispatch station, said data including a station number unique to the work station to which each material is to be transported by said sorting conveyor means, said data further including a dispatch time number unique to the time at which said material is dispatched from said central dispatch station, said memory means including data entry means at said central dispatch station;
computer circuit means coupled to said memory means and to said sorting conveyor means for controlling said sorting conveyor means in response to said data to deliver each of said transported materials to the desired work station; and
display means coupled to said computer circuit means for displaying said data in real time to provide real time information relating to the materials.

29. A system as defined in claim 28 wherein each of said materials is of a certain type, and wherein said data further includes a type number unique to said material type.

30. A system for controlling, and collecting real time data relative to, the flow of work materials within a work area including a plurality of work stations at which said materials are processed by human operators comprising:
a central storage area in which work materials are stored, said storage area including a central dispatch station for dispatching work materials from said storage zone;
signaling means at each of said work stations for indicating to said central dispatch station that work material is requested at the work station;
sorting conveyor means for transporting the work materials from said central dispatch station directly to the work stations;
computer memory means for storing data in real time for each work material dispatched from said central dispatch station, said data including a station number unique to the work station to which each material is to be transported by said sorting coonveyor means, said memory means including data entry means at said central dispatch station;
computer circuit means coupled to said memory means and to said sorting conveyor means for controlling said sorting conveyor means in response to said data to deliver each of said transported materials to the desired work station;
second signaling means at each of said work stations for indicating that a work material is in route to the work station; and
display means coupled to said computer circuit means for displaying said data in real time to provide real time information relating to the materials.

31. A system for controlling, and collecting real time data relative to, the flow of work materials within a work area including a plurality of work stations at which said materials are processed by human operators comprising:
a central storage area in which work materials are stored, said storage area including a central dispatch station for dispatching work materials from said storage zone;
signaling means at each of said work stations for indicating to said central dispatch station that work material is requested at the work station;
sorting conveyor means for transporting the work materials from said central dispatch station directly to the work stations;
computer memory means for storing data in real time for each work material dispatched from said central dispatch station, said data including a station number unique to the work station to which each material is to be transported by said sorting conveyor means, said memory means including data entry means at said central dispatch station;
computer circuit means coupled to said memory means and to said sorting conveyor means for controlling said sorting conveyor means in response to said data to deliver each of said transported materials to the desired work station;
third signaling means at each of the work stations for indicating that an operator is not present at the work station; and
display means coupled to said computer circuit means for displaying said data in real time to provide real time information relating to the materials.

32. A system for controlling, and collecting real time data relative to, the flow of work materials within a work area including a plurality of work stations at which said materials are processed by human operators comprising:
a central storage area in which work materials are stored, said storage area including a central dispatch station for dispatching work materials from said storage zone;
signaling means at each of said work stations for indicating to said central dispatch station that work material is requested at the work station;
sorting conveyor means for transporting the work materials from said central dispatch station directly to the work stations, said sorting conveyor means including means for indicating the position of materials on said conveyor;
computer memory means for storing data in real time for each work material dispatched from said central dispatch station, said data including a station number unique to the work station to which each material is to be transported by said sorting conveyor means, said memory means including data entry means at said central dispatch station;
computer circuit means coupled to both said memory means and to said sorting conveyor means including said position indicating means for controlling said sorting conveyor means in response to both said data and said position indicating means to deliver each of said transported materials to the desired work station; and
display means coupled to said computer circuit means for displaying said data in real time to provide real time information relating to the materials.

* * * * *

UNITED STATES PATENT AND TRADEMARK OFFICE
CERTIFICATE OF CORRECTION

PATENT NO. : 4,484,289
DATED : November 20, 1984
INVENTOR(S) : Robert F. Hemond

It is certified that error appears in the above-identified patent and that said Letters Patent is hereby corrected as shown below:

Column 4, line 37:
 "numerals" should be --numeral--;

Column 8, lines 6-7:
 "determined" should be --determine--;

Column 8, line 8:
 "aboveaverage" should be --above-average--;

Column 8, line 11:
 "if" should be --is--;

Column 13, line 26:
 "work station" should be --work stations--;

Column 13, line 44:
 after "storage" insert --zone;--; and

Column 15, lines 45-46:
 "coonveyor" should be --conveyor--.

Signed and Sealed this

Ninth Day of July 1985

[SEAL]

*Attest:*

DONALD J. QUIGG

*Attesting Officer*  *Acting Commissioner of Patents and Trademarks*